United States Patent [19]

Tsou

[11] 4,112,214

[45] Sep. 5, 1978

[54] METHOD OF PREPARING POWDER PARTICLES BY CONTROL OF THE PARTICLE SHAPE

[75] Inventor: Ivan H. Tsou, Bloomfield Hills, Mich.

[73] Assignee: Grow Chemical Corp., New York, N.Y.

[21] Appl. No.: 747,221

[22] Filed: Dec. 3, 1976

Related U.S. Application Data

[63] Continuation of Ser. No. 557,538, Mar. 12, 1975, abandoned, which is a continuation-in-part of Ser. No. 460,109, Apr. 11, 1974, abandoned.

[51] Int. Cl.² .............................................. C08F 6/12
[52] U.S. Cl. .............................. 528/494; 260/23 R; 528/480; 528/491; 528/499
[58] Field of Search ................ 528/480; 260/23 R; 526/494, 499

[56] References Cited

U.S. PATENT DOCUMENTS

| | | | |
|---|---|---|---|
| 2,379,237 | 6/1945 | Jenkins | 260/37 |
| 2,722,528 | 11/1955 | Johnson | 260/223 |
| 3,737,401 | 6/1973 | Tsou et al. | 260/23 R |
| 3,772,252 | 11/1973 | Blunt | 260/75 T |

FOREIGN PATENT DOCUMENTS 1,138,180  12/1968  United Kingdom ................. 260/23 R Primary Examiner—William F. Hamrock
Attorney, Agent, or Firm—Burton, Parker & Schramm

[57] ABSTRACT

The process of preparing powder particles having a desired particle shape, comprising the steps of: providing a paint solution having a film-forming portion and a first solvent portion, forming droplets containing the film-forming portion and the solvent portion, by contacting the paint solution with a second solvent which is partially miscible with the first solvent and in which the film-forming portion is non-soluble, the second solvent being substantially saturated with the first solvent, diluting said droplets with a sufficient quantity of a third solvent which is at least partially miscible with the first solvent and in which the film-forming portion precipitates as powder particles, and controlling the shape of the powder particles by regulating the dilution of the first solvent in the droplets.

10 Claims, 5 Drawing Figures

METHOD OF PREPARING POWDER PARTICLES BY CONTROL OF THE PARTICLE SHAPE

CROSS REFERENCE TO RELATED APPLICATION

This is a continuation of application Ser. No. 557,538, filed Mar. 12, 1975, now abandoned, which is a continuation-in-part of U.S. Ser. No. 460,109, filed Apr. 11, 1974, now abandoned which is hereby incorporated by reference.

BACKGROUND OF THE INVENTION

Powder particles have become highly desirable as a means of coating various substrates. For a description of powder paints and methods of application see *Iron Age*, Nov. 16, 1972, pages 67 to 74, and *Chemical Engineering*, July 12, 1971, pages 36 to 38. Use of the particles has become of interest primarily as powder paint. In other words, powder paint relates to the application of film-forming materials onto a substrate in order to coat that substrate to give a desired finish without the presence of a solvent. The particles contain the film-forming substances and pigments.

U.S. Pat. No. 3,737,401 teaches the method of preparing powder paint by physically dividing a liquid paint, in the presence of a coagulating liquid, to minute deoplets of uniform composition and subsequently diluting said droplets to remove the solvent.

It has been determined that the control of the shape of the particle that is produced by the process of U.S. Pat. No. 3,737,401 is desirable in order to control the film characteristics of the coated materials as well as the application of the powder to form the film. It is an object of the present case to prepare powder particles of controlled shape by modifying the conditions of preparation.

SUMMARY OF THE INVENTION

The invention is concerned with the preparation of powder particles having a desired particle shape by employing the principle of mutual solubility. Droplets of a paint solution will be formed containing the film-forming portion and the solvent portion by contacting the liquid paint with a solvent that is mutually soluble with the solvent for the paint and subsequently diluting the droplets, removing the solvent for the film-forming portion and controlling the shape of the powder particles. The powder particles may remain dispersed in the final liquid medium which would be the product of the process, or the powder particles may be subsequently separated from the solution, dried and packaged.

This invention is an improvement of the process for preparing powder particles described in U.S. Pat. No. 3,737,401 which is hereby incorporated by reference. The particles produced according to this invention may have one, two or three dimensions.

DESCRIPTION OF PREFERRED EMBODIMENTS

Figure 1:
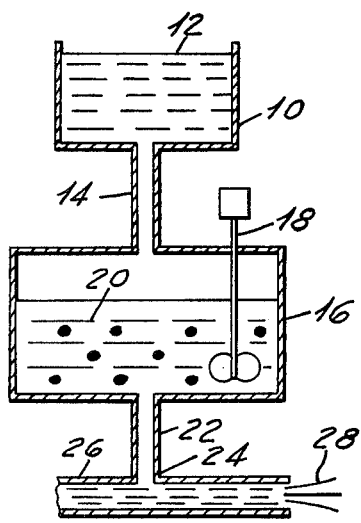
FIG. 1 is a schematic diagram of the process of the present invention relating to the preparation of unidimensional powder particles.

The invention of the present case is concerned with the method of preparing powder particles having a desired particle shape comprising the steps of:

(1) providing a paint solution having a film-forming portion and a first solvent portion, said first solvent substantially dissolving the film-forming portion, (2) forming droplets containing the film-forming portion and the first solvent portion by contacting said paint solution with a second solvent which is partially miscible with the first solvent and in which the film-forming portion is not soluble, the second solvent being substantially saturated with the first solvent, (3) diluting said droplets with a sufficient quantity of a third solvent which is miscible with the first solvent and in which the film-forming portion precipitates as powder particles, and (4) controlling the shape of the power particles by regulating the rate of dilution of the first solvent in the droplets.

While applicant does not wish to be tied to any particular theory as to the operability of the invention, the particular shape is controlled following the below described principles, it is believed.

When applicant refers to "one, two or three dimensions", it is meant that the particles formed according to the process of the present invention may have any one of the desired physical dimensions of substantially only length (one dimension), length and width (two dimensions) or length, plus width plus depth (three dimensions).

Particles that can be considered substantially one dimensional are fibrous or filamentary in nature much like a wire or thread, where the length is substantially greater than the width, so that it can be said that there is substantially no width.

Particles that can be considered two dimensional are much like plates or flat disks. The shapes may not be a fixed geometric shape, such as square, triangular, rectangular with the only provision being that there is but two dimensions of length and width.

The particles that can be considered three dimensional have an appearance that can be considered spherical, multifaceted, irregular, symmetrical, and the like.

Other parameters must also be taken into consideration when applicant's mutual solvent system is employed to form particles of desired shape. When a solution of film-forming compounds and solvent (hereinafter called Solvent A) for the film-forming components is mixed with another solvent (hereinafter called Solvent B), which is a non-solvent for the film-forming components but which is mutually solvent with Solvent A, fine droplets are formed of Solvent A and film-forming components. If a sufficient period of time is permitted to pass, a spherical droplet will be formed because this is the posture of the minimum surface energy effected by surface tension (interfacial tension), between the droplet and Solvent B. This is the minimum energy level for the droplet.

It is believed that prior to applicant's invention, there was no widespread commercially available way to obtain powder paint particles of a substantially uniform composition, other than irregular shaped particles which are obtained from grinding dried paint drops or like processes. Some processes, such as the so called "Spray Dry" technique produced in limited amounts powder particles of a material composition which is not heat sensitive, otherwise the drying at high temperatures would deteriorate the desired compositions. By engaging applicant's process one can obtain a substantially uniform consistency of powder particles of the shape desired.

It should be pointed out that the powder compositions produced according to applicant's process have unique properties. If a substantially all spherical powder composition is employed, then the physical flowing properties of the composition will be improved since there is substantially less friction involved as there would be for a substantially all irregular shaped powder composition.

In addition it is believed that the characteristics of film buildup and ability of particle to carry electrical charge vary with the physical dimensions of the particle. Therefore the film buildup is related to the ratio of surface area of the particle to volume of the particle. It is believed that a particle substantially spherical will take less charge during the electrostatic spraying of the particle but that it also loses less charge during the passage of the particle from the charging area (usually spray gun) to the desired substate. Conversely, an irregular shaped particle will take more initial charge but loses more charge, as compared to the spherical particles.

The all spherical powder composition when electrostatically sprayed may keep the charge entirely too long for certain powders and will gather dust thereon due to static electricity. Also an all irregular shaped powder composition when electrostatically sprayed will dissipate its charge so rapidly that the power particle may not have sufficient charge to adhere to the desired substrate and therefore cannot be electrostatically sprayed. This is precisely the situation with respect to powdered polyvinyl chloride currently available. The particle shapes are not sufficient to hold the charge for electrostatically spraying the particle.

By employing applicant's process of preparing the powder of varying desired shape, film forming dielectric, such as a PVC powder composition can be electrostatically sprayed resulting after cure in very fine film having a thickness of about 0.5 to about 5 mils, or less, to 3 mils. This can be accomplished by producing a powder composition that is substantially spherical.

It can be seen that by following applicant's process, one now has the ability to vary another parameter (particle shape) in the application of a film former to a substrate. If, for example, one has found that an all spherical composition has certain undesirable results, such as, holding static electricity, then one can vary the shape from spherical, but yet, not totally irregularly shaped. As can be seen, all of this can be done without varying the film forming composition. It should be appreciated however, that one may wish to design a film forming composition which is to be used to produce a powder particle.

It is to be appreciated that applicant can produce powder compositions that are not necessarily limited to powder paint compositions but preferably are so limted.

Applicant can produce powder compositions which allow the formation of the appropriate dimensional powder particle to obtain the desired film property, such as thickness, hardness, color, hue, pigmentation, and the like.

In view of the above it can be seen that one may be able to control the thickness of the paint film and therefore overcome the dielectric or insulative nature of the film because a higher charge can be held by spherical particles than irregular shaped particles. Also one can vary the flow particles of the film by varying the particle shape. Irregular shaped particles will flow at lower temperatures than spherical shaped. Therefore by merely altering the particle shape one can alter the properties of the film (fusion temperature, film thickness, and the like).

The first step of the process for preparing the powder particles is providing a solution having a film-forming portion and a first solvent portion. (Solvent A) It is preferred that the solution be a paint prepared in the normal processing techniques. In other words, the paint would be a liquid paint containing a solution of the film-forming portion which can be any one of a number of compositions such as various resins as alkyd, urethanes, polyesters, polyamides, epoxies, vinyls, such as from monomers as vinyl chloride, acrylic acid or esters, methacrylic acid or esters, acrylamide and N-substituted acrylamides, styrene, vinyl toluene, copolymers thereof and the like, hydrocarbon resins, varnishes, such as oleoresinous and spirit varnishes, and the like. Of the above enumerated film-forming portions it is preferred that an acrylic acid or ester or methacrylic acid or ester resin be employed with the epoxy, vinyl chloride and polyester resins must preferred of the other enumerated resins.

Other resins may also be used in applicant's process to produce the desired powder composition. Any film forming resin may be used, such as, polyolefins, such as, polyethylene, polypropylene, and copolymers thereof, and the like, polycyclopentadiene, polydienes, as, butadiene, is oprene and copolymers thereof such as, styrene - butadiene (SBR), acrylonitrile - styrene - butadiene (ABS), and the like, polymides, organic silicones, and the like.

The solution in which the film-forming portion is dissolved is a solvent for the film-forming portion (solvent A). In order to control the shape of the particle the solution having the film-portion is contacted with a second solvent (solvent B) thereby forming droplets. The droplets that are formed in this separate solution are of a composition substantially similar to that of the first solution. In order words, the droplets that are present in solvent B have substantially the same ratio of the film-forming portion to the solvent A portion as was present in the solution of the first step. Solvent B that is used is one that is partially miscible with the first solvent but is substantially non-soluble with respect to the film-forming portion. The basis for this condition is that solvent B is usually a stable medium for the first solvent. Solvent B is a liquid medium in which the droplets will be formed of the film-forming portion but the relative content of solvent A in these droplets is substantially the same, for solvent B is substantially unable to dissolve substantial portions of solvent A so that the content of solvent A in solvent B (or vice versa) is not substantially altered.

In some instances solvent B may be able to dissolve some additional amount of solvent A. But this is generally because the solvents have not been agitated sufficiently for equilibrium to be reached. All that is required for solvent B is that it be a stable medium into which solvent A plus film former may be added so that the droplets of film former may be formed. When one employs solvents that are partially miscible, two layers of solvent may form. When the relative quantities of the two components (solvent A and solvent B) are such that the two liquid layers coexist, one of the layers is a saturated solution of A in B while the other is a saturated solution of B in A. The two liquid layers and phases in equilibrium are called conjugate solutions. Outlined in Table I are representative solvents are partially miscible in each. Therefore while the ratio of solvent A to film former may vary slightly when the droplets are formed in solvent B, nonetheless, the droplets are formed due to the insolubility of the film former in solvent B.

After the droplets are formed, the powder particles may then be formed by removal of the solvent A from the droplets. The various powder shapes are formed by the dilution of the solvent A into a third solvent as well as by mechanical or physical treatments of the droplets.

The principle being employed in the direct contact of the solvents is one that permits control of the removal of solvent A from the film-forming portion.

PREPARATION OF UNIDIMENSIONAL POWDER PARTICLES

Referring now to FIG. 1, liquid paint 12, a solution of solvent and film former, is contained in tank 10 and is pumped or is flowed via line 14 into tank 16 having agitator 18. After a sufficient size of droplets 20 are obtained, due to the agitation, the solution is then passed via line 22 through a venturi 24 which is a lead to a pipe through which solvent C is flowing. Due to the swift movement of solvent C past the outlet of the venturi, the solvent A is rapidly removed from the droplet and from solvent B by being diluted into solvent C at the same time the film former of the droplet is precipitated, thereby being stretched into a fibrous of filamentary form 28 shown at the outlet of pipe 26.

PREPARATION OF TWO DIMENSIONAL POWDER PARTICLES

Figure 2:
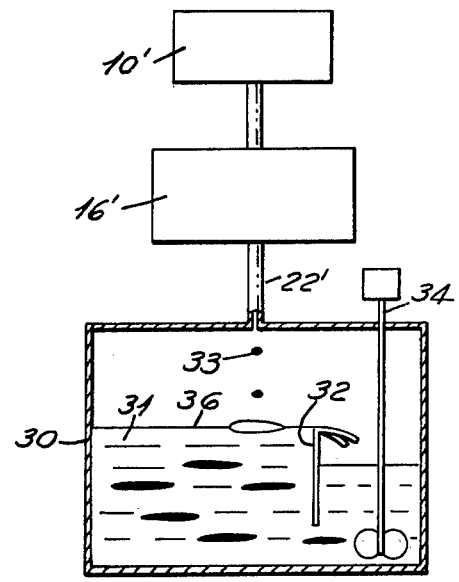
FIG. 2 is a schematic diagram of the process of the present invention relating to the preparation of powder particles having only two dimensions.

The same procedure for unidimensional powder preparation is followed with respect to the initial tanks that are identified as tank 10' and 16' with no substantial difference in the handling of the droplets formed in tank 16' This is expresed in FIG. 2. The droplets 33 from tank 16' are slowly dropped or sprayed onto a liquid surface 31 (solvent C) in tank 30, having weir 32 and agitator 34 which allows for very slow movement of solvent C in tank 30 merely sufficient to provide a surface of solvent C. Therefore once the disks or plates are formed at the surface 36 of solvent C then no further solvent A may be removed therefrom and the powder particles remain in their shape as was formed when they hit the surface of solvent C. For practical purposes, solvent C should be one that has a high surface tension, such as water, which can rapidly precipitate the powder by rapidly removing solvent A from the droplet.

PREPARATION OF THREE DIMENSIONAL POWDER PARTICLES - SPHERICAL SHAPED

Figure 3:
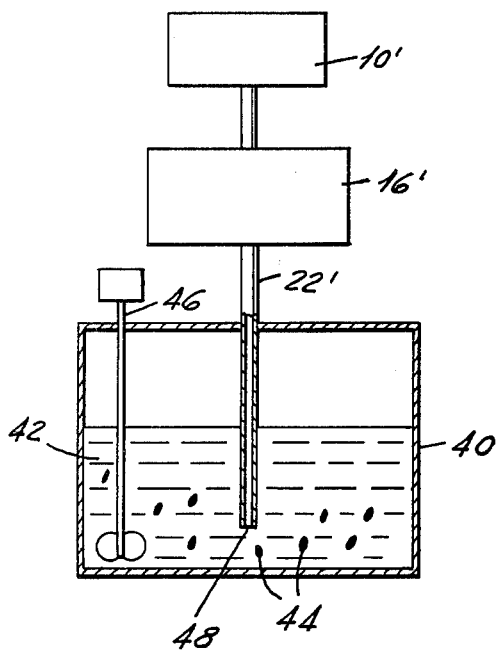
FIG. 3 is a schematic diagram of the process of the present invention relating to the preparation of spherically shaped powder particles.
Figure 4:
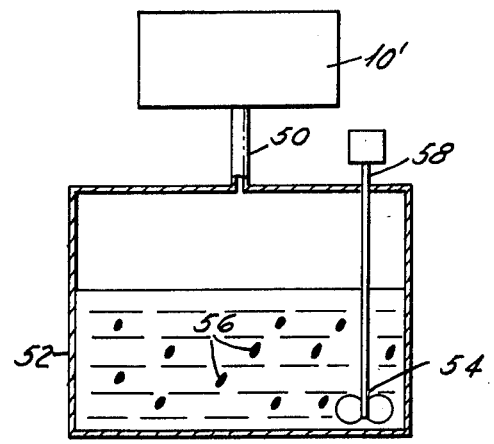
FIG. 4 is a schematic diagram of the process of the present invention relating to the preparation of irregularly shaped powder particles.

Following the same procedure for preparation of unidimensional powder particles with respect to employing the first two tanks identified in FIG. 3 as 10' and 16', after agitation of the droplets to obtain satisfactory size and spherical shape, the solution is then passed from tank 16' into tank 40 containing solvent C (42). The particles 44 that are formed are of very fine size, generally spherical. The solvent C is agitated by agitator 46 to allow for complete removal of solvent A from the particles. To allow uniform removal or dilution of solvent A into solvent C, the droplets are passed into solution C under the surface of solvent C at outlet 48 of pipe 22.

FORMATION OF IRREGULAR SHAPED PARTICLES

FIG. 4 schematically shows the formation of irregularly shaped three dimensionally shaped particles. Using the same liquid as in FIG. 1 from the first tank, identified also as 10', a solution of solvent A and film formers is fed through line 50 directly into tank 52 containing solvent C (54) which immediately removes solvent A from the droplets which are formed rather quickly. However before a spherical shape could be formed, the shaping is interrupted and therefore irregularly shaped particles 56 result. The solution C in tank 52 is agitated by means of agitator 58 in order to eliminate or remove as quickly as possible, solvent A and dilute or dissolve it into solvent C. The agitator also allows for physical means or dividing the droplets as the solvent A is being removed therefrom. As can be seen from above, solvent C is a dilution solvent. The function of this third solvent is to remove in a controlled fashion solvent A thereby precipitating the powdered particles.

As can be appreciated, solvent C may vary from the solvent B simply to the extent of the amount that the solvent A is present in the third solvent i.e. solvent B and C may be comprised of the identical chemical compounds or entities. In other words, since the solvent A is partially soluble with the second and third solvent, one can vary the content of the first solvent in the third or diluting solvent. Since the extent of dilution (or miscibility) of one solvent in another is reasonably well known to one of skill in the art, one may control the rate that solvent A will leave the film-forming portion. Therefore, solvent C may have substantially no solvent A in it when it (the dilution solvent) first contacts or dilutes the droplets. Suitable examples of solvents that may be employed see Table I. Also indicated is that amount that each is soluble in the other. Therefore to control the rate of dilution of solvent A into solvent C, one therefore varies the concentration of solvent A in solvent C. Preferably solvent C has little or no solvent A therein. Most preferably solvent C is water. It should be appreciated that one would select solvent A based on the amount necessary to achieve conjugate solutions for in designing a complete system, one would separate such as by distillation, solvent A from solvent C. The separation is designed to achieve minimum energy requirements.

TABLE I

| Examples of Solvent A | % by Weight of Solvent A in $H_2O$ | % by Weight of $H_2O$ in Solvent A |
|---|---|---|
| Alcohols | | |
| 1-Butanol | 7.7 | 20 |
| 2-Butanol | 20 | 36.3 |
| Isobutanol | 8.5 | 15 |
| 1-Pentanol | 2.6 | 9.5 |
| 2-Pentanol | 4.9 | 11 |
| Amyl Alcohol (mixed Isomers) | 1.7 | 9.2 |
| 1-Hexanol | 0.58 | 7.2 |
| 2-Ethyl Butanol | 0.43 | 4.56 |

TABLE I-continued

| Examples of Solvent A | % by Weight of Solvent A in H₂O | % by Weight of H₂O in Solvent A |
|---|---|---|
| 2-Ethyl Hexanol | 0.07 | 2.6 |
| 2,6-Dimethyl-1-4-Heptanol | 0.06 | 0.99 |
| Esters | | |
| Methyl Acetate | 24.5 | 8.2 |
| Ethyl Acetate | 8.7 | 3.3 |
| Butyl Acetate | 0.68 | 1.2 |
| Isopropyl Acetate | 2.9 | 1.8 |
| Cellosolve Acetate (CH₃COOC₂H₄OC₂H₅) | 22.9 | 6.5 |
| Butyl Carbitol Acetate CH₃COO[C₂H₄O]₂ C₄H₉ | | |
| Ethyleneglycol Diacetate | 16.4 | 7.0 |
| Keytones | | |
| Methyl ethyl Ketone | 26.8 | 11.8 |
| Methyl propyl ketone | 4.3 | 3.3 |
| Methyl isobutyl ketone | 1.9 | 1.6 |
| Methyl-butyl ketone | 1.4 | 2.1 |
| Cyclohexanone | 2.5 | 8.0 |
| Glycol Ethers | | |
| C₄H₉O—CH₂CH(CH₃) OH | 6.4 | 15.5 |

As is outlined above and in U.S. Pat. No. 3,737,401, a slurry of powder particles results from the process, which may subsequently be filtered, washed, divided into desired particle sizes and packaged as a slurry or dried for dry powder packaging. An example of a slurry in which the particles could be employed is described in U.S. Pat. No 3,787,230 hereby incorporated by reference.

It can be appreciated here that the particles resulting from this process may be used for a desirable number of end uses, such as dry particles for electrostatic spraying, forming slurries for application to a substrate such as metal and the like. It should also be appreciated that the film-forming portion may include pigments which are normally used in liquid paints as well as flow control agents to improve the flowing properties of the film formers during curing, catalysts to accelerate the curing of the film and other agents to impart other desirable properties to the film.

Figure 5:
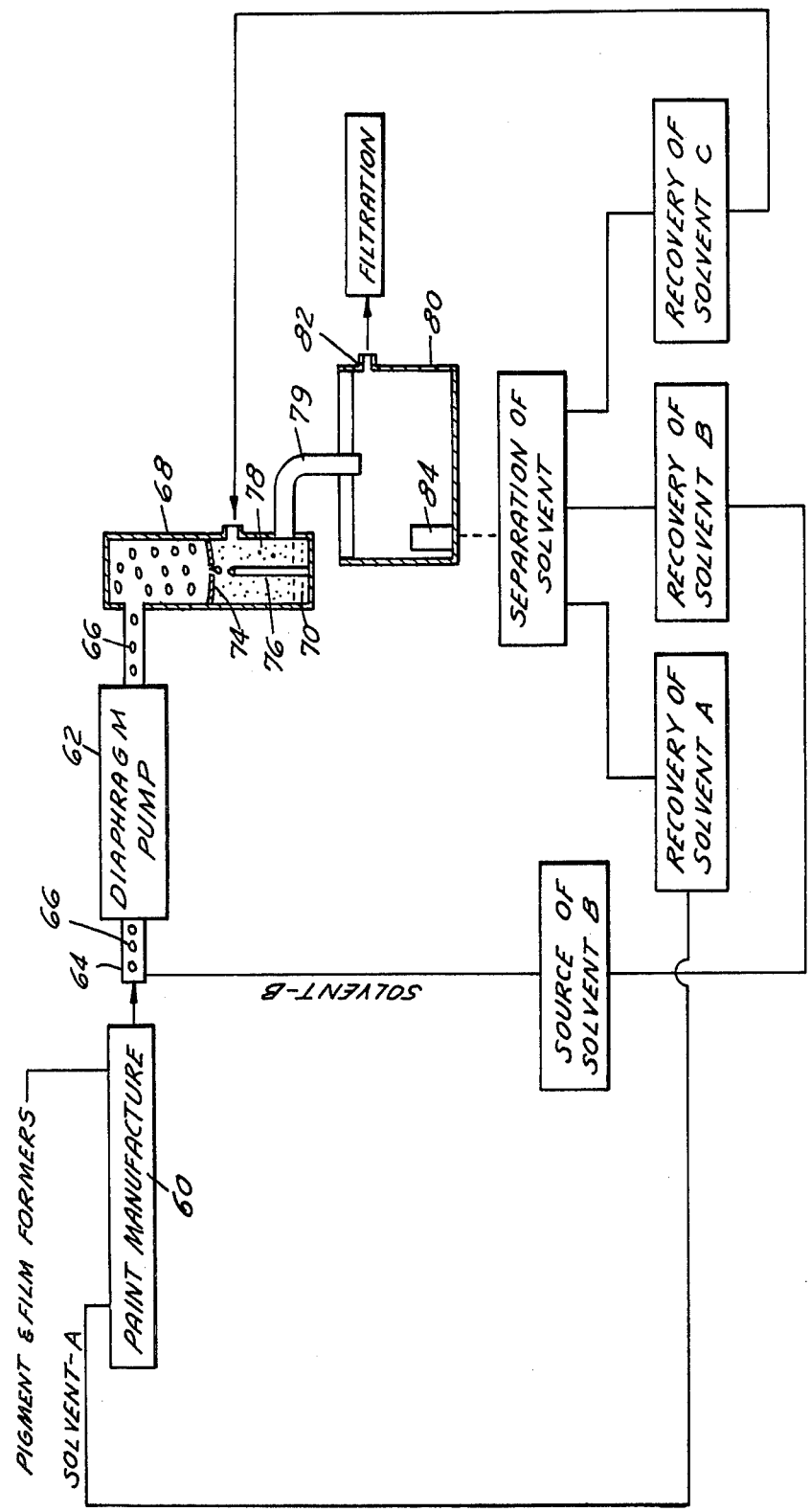
FIG. 5 is a schematic diagram of the process of the present invention relating to the use of a sonic particle dispersing unit and various solvent separation and recovery steps.

In FIG. 5 there is an alternate way of producing the powders of controlled shape. Following the normal paint manufacture, composed of solvent A and pigment and film formers, a solution is prepared in tank 60. As the liquid is passed to diaphragm pump 62, solvent B is passed into the line 64 upstream of the pump, thereby producing droplets 66, which are then passed to tank 68.

Tank 68 is composed of an upper and lower portion separated by a slotted V-shaped trough 74 through which the droplets pass. Solvent C 70 is present in the lower portion. By means of a sonic dispersing means 76 the particles 78 are physically divided as they are precipitated. The entire unit 68 is available from Sonic Engineering Corp. of Norwalk, Conn. After passing from the sonic dispersing unit, the finely divided particles are passed to a separation tank 80 via line 79 which may be maintained at a sufficient level to allow the major portion of particles to flow to subsequent filtration via exit 82. A good portion of the liquid may then pass through filter 84 for subsequent separation and reuse.

The powder particles produced according to the process of the present invention generally range in size from about 0.1 microns to about 150 microns, preferably for electrostatic spraying having an average particle size of 35 microns or less. The fibrous particles may have a length of up to 1,000 microns, although a length of 100 – 200 is preferred and a cross-section of about 5 microns.

One can also make oval shaped particles by the above process for fibers wherein the length is about 1.5 times the diameter.

The invention can also be said to be directed towards a process of preparing powder paint particles having a desired particle shape comprising the steps of:

providing a pigmented solution having a film forming portion and a first liquid portion in which the film forming portion is soluble;

forming droplets containing the film forming portion and the first liquid portion by contacting the solution with a second liquid which is at least partially miscible with the first liquid and in which the film forming portion is non-soluble, the second liquid being saturated with the first liquid;

diluting said droplets with a quantity of water in which the film forming portion precipitates as particles, whereby the first liquid is removed from the droplets by the water, the quantity by weight of the water employed being at least five times that of the first liquid; and controlling the shape of the powdered particles by regulating the dilution of the first liquid from the droplets.

While having described the invention above in its general aspects, listed below are examples that further amplify the invention wherein temperatures are given in degrees Fahrenheit and percentages are percentages by weight unless otherwise indicated.

EXAMPLES 1-3

A green pigmented vinyl coating was prepared by dissolving a mixture of vinyl powders: (a) 90% bakelite E2000 (vinyl chloride resin of medium molecular weight and melting range of 120°–135° C and (b) Union Carbide VMCH (copolymer of vinyl chloride (86%) and vinyl acetate (13%) with 1% of an interpolymerized dibasic acid (0.7–0.8 carboxyl) in methyl ethyl ketone (solvent A). Solvent B was methyl ethyl ketone saturated in water while solvent C was deionized water. Table II indicates the various amounts of components.

TABLE II

| | (All Parts by Weight) | | |
|---|---|---|---|
| | A | B | C |
| Film former | 20 | 35 | 40 |
| Solvent A | 80 | 65 | 60 |
| Solvent B | 800–1200 | 800–1200 | 500–1500 |
| Solvent C | 5600–17000 | 5500–16000 | 3200–200,000 |

The particles were processed according to the steps outlined in FIG. 3 so that they were substantially spherical having an average diameter of about 25 microns. The particles were separated from the water and dried. They were then electrostatically sprayed at 45 KV onto a metallic panel. The treated panel was subjected to heat of 350° F for 5 minutes whereupon a smooth film of 1.5 mils was produced which can be characterized as flexible, having a high tensile strength film with a tukon hardness of 3-10.

The ratio of solvent C to solvent A may be as low as 5-1 with no real upper limit. The practical upper limit is dictated by overall system design in optimizing the process parameters, in particular, quality of powder, ability to separate and reuse solvents, and the like.

It is to be appreciated that solvent C may be completely miscible with solvent A. This may facilitate the dilution of solvent A from the droplets. Conversely, solvents B & C may be comprised of substantially identical chemical entities. In the latter case, solvents A & B should be only partially miscible.

Substantially equivalent results are obtained when a pigment, such as $TiO_2$ is employed with the film-former.

EXAMPLES 4-12

Various solutions were prepared with the composition shown in Table III. The procedure for forming the particles is as follows: Components No. 1 and 3 were added to No. 11 and then 2, 4, 8 and 10. Then Components 5 or 6 and 9 were added. Just before precipitation, No. 7 is added.

Solvent B (10% ethyl acetate, 90% water, by volume) was prepared. The procedure shown in FIG. 3 was followed. After various solutions (4-12) were prepared, the pump in container 16' was turned on and operated at 5,000 RPM. Then each paint solution was pumped at about 100 pounds per inch$^2$ gage through nozzles having an orifice diameter of 0.012" (nozzle with 0° solid stream tip) into container 16' near the rotating agitator. Solvent B in container 16' amounted to 10,000 ml. Fine droplets of spherical shape are formed. After each solution was passed into container 16', the total contents were then passed into a 55 gallon drum (40) containing 30 gallons of deionized water which was agitated. The contents of container 16' were pumped under the surface of the water in the drum and entered the drum near the agitator and were allowed to wash for 1 to 2 hours. The particles produced had a composition substantially similar to the starting liquid paint composition except the solvent was substantially removed therefrom. The particles subsequently were separated from the solution and dried. They were substantially spherical and ranged in diameter from 5 to 150 microns, which after drying had a range of size of 10 to 75 microns.

2-3% by weight in isopropyl alcohol and increasingly soluble in higher alcohols, insoluble in water. Cab-o-sil is a trademark of Cabot Inc. and is a thickening and thixotropic agent of a fumed silica type which is produced by the hydrolysis of vaporized silicon tetrachloride in a flame of hydrogen and oxygen. Ferro 840 is a trademark of Ferro Chemical Corporation and is alkyl tin heat stabilizer having a specific gravity of 1.11 and a viscosity of A-1 Garner.

It is to be appreciated that the liquid paint solids may also range up to 30 to 75% solids, if desired.

EXAMPLE 13

A solution (34% solids) of the components of Table IV was prepared and weighed 8.2 lbs. per gallon with a viscosity of 64.2 seconds Ford Cup No. 4. The procedure for preparing the droplets and particles was that of Examples 4-12, except 7.5 gallons of paint were used with 75 gallons of Solvent B and the agitator in container 16' was operating at 1,000 RPM.

TABLE IV

| | | Parts By Weight |
|---|---|---|
| 1 | OEX-1615 | 53.94 |
| 2 | VMCH | 5.1 |
| 3 | Cellulose Acetate Butyrate | 4.0 |
| 4 | Modaflow | .4 |
| 5 | Ferro 840 | .8 |
| 6 | EPON-201 | 2.0 |
| 7 | Triisodecyl Trimellitate | 7.84 |
| 8 | 1,2,4-(Trioctyl Formate) Benzene | 7.84 |
| 9 | Ethyl Acetate | 192.91 |
| 10 | Carbon Pigment | 1.65 |

See Table III for definition of the marks.

After separation and drying, the particles obtained were substantially spherical in shape and ranged in size from a diameter of 10 microns to about 75 microns. The composition of the particles is substantially the same as the starting liquid paint composition except the solvent has been removed therefrom.

TABLE III

| Component Number | | 4 | 5 | 6 | 7 | 8 | 9 | 10 | 11 | 12 |
|---|---|---|---|---|---|---|---|---|---|---|
| 1 | EPON-201 | 266 | 266 | 266 | 244 | -0- | 122 | 110 | 110 | 100 |
| 2 | EPONOL 55-B-40 | 50 | 100 | 100 | 122 | 100 | 244 | 270 | 270 | 300 |
| 3 | OEX-1615 | 26.5 | 50 | 50 | 75 | 305 | 75 | 75 | 75 | 75 |
| 4 | VMCA | 78 | | | | 31 | | | | |
| 5 | Trimellitic Anhydride | -0- | 35 | -0- | | | | | | |
| 6 | Azalic Acid | | | 51 | 47 | | 25 | 25 | 25 | 25 |
| 7 | $SnO_2$ | 4 | -0- | -0- | -0- | | | | | |
| 8 | Modaflow | 3 | 3 | 3 | 3 | 3 | 3 | 3 | 3 | 3 |
| 9 | Cab-o-sil | 1.5 | 1.5 | 1.5 | 1.5 | 1.5 | 1.5 | 1.5 | -0- | -0- |
| 10 | Ferro 840 | | | | | 5 | | | | |
| 11 | Ethyl Acetate | | | | Adjusted to have 30% solids content | | | | | |

Epon -201 and Eponol 55-B-40 are trademarks of Shell Oil Company for epichlorohydrin/bisphenol A type epoxy resin generally of the structure

EXAMPLE 14

Spherical shaped acrylic powder was prepared following the procedure of Examples 4-12. One part of liquid paint was used with 10 parts of Solvent B (26.8% methyl ethyl ketone by volume in water). The washing in the drum containing water lasted about 1 hour. The liquid paint had the composition of Table V.

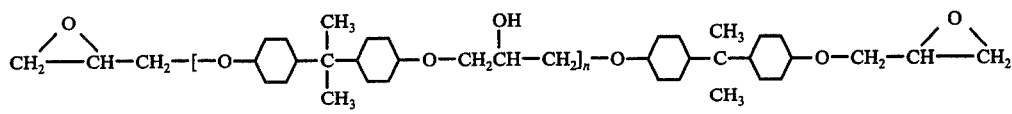

OEX-1615 is a trademark of Union Carbide for a modified vinyl chloride resinous product. VMCA is a trademark of Union Carbide for a vinyl resin having the composition parts by weight, of vinyl, vinyl acetate and maleic acid 81/17/2). Modaflow is a trademark of Monsanto and is a complex polymeric plasticizer and is soluble in benzene, toluene, xylene, kerosene, petroleum ether, carbon tetrachloride, mineral oil, approximately

TABLE V

| | Parts By Weight |
|---|---|
| Thermoplastic acrylic film-former having hydroxyl functionality | 347.8 |
| Cross-linking agent (isophorone diisocyanate blocked with methyl isobutyl ketoxime (equimolar) and product reacted (equimolar) with 1,6-hexanediol) | 34.0 |
| Modaflow | 2 |
| $TiO_2$ | 60 |
| Methyl ethyl ketone | 128 |
| OH/NCO ratio (acrylic film-former/cross-linking agent) | 1 |

For a further description of the cross-linging agent reference may be made to U.S. Ser. No. 481,884, filed June 21, 1974 now abandoned and U.S. Ser. No. 496,066 filed Aug. 9, 1974 both of which are hereby incorporated by reference.

The particles produced according to this process were substantially spherical in shape and ranged in diameter from about 5 to 150 microns in the wet state and about 10 to about 75 microns in the dry state.

What is claimed is:

1. A process for preparing powder paint particles having a desired particle shape comprising the steps of:
    providing a pigmented solution having a film forming portion comprised of polyvinyl chloride and a first liquid portion in which the film forming portion is soluble;
    forming droplets containing the film forming portion and the first liquid portion by contacting the solution with a second liquid which is at least partially miscible with the first liquid and in which the film forming portion is nonsoluble, the second liquid being saturated with the first liquid, and providing further that the second liquid is a solution mixture of water saturated with the first liquid;
    diluting said droplets with a quantity of water in which the film forming portion precipitates as particles, whereby the first liquid is removed from the droplets by the water, the quantity by weight of the water employed being at least five times that of the first liquid; and
    controlling the shape of the powdered particles by regulating the dilution of the first liquids from the droplets.

2. The process of claim 1 further comprising controlling the shape of the powdered particles to produce substantially unidimensional particles.

3. The process of claim 1 further comprising controlling the shape of the powdered particles to produce substantially two dimensional powders.

4. The process of claim 1 wherein the solution provided is a pigmented paint solution.

5. The process of claim 1 wherein the first liquid is a glycol ether type.

6. The process of claim 1 wherein the first liquid is ethylene glycol monoethyl ether acetate.

7. The process of claim 1 wherein the dilution of the first liquid in the droplets into water is obtained by uniform contact of the droplets with the water.

8. The process of claim 1 further comprising forming spherical shaped droplets in the second liquid prior to the dilution with water.

9. The process of claim 1 further comprising passing the droplets onto a surface of the water, thereby diluting the first liquid from the droplets.

10. The process of claim 10 wherein the regularly shaped three dimensional particles are formed by contacting the solution with water.

* * * * *

UNITED STATES PATENT OFFICE
CERTIFICATE OF CORRECTION

Patent No. 4,112,214      Dated September 5, 1978

Inventor(s) Ivan H. Tsou

It is certified that error appears in the above-identified patent and that said Letters Patent are hereby corrected as shown below:

In Column 12, Line 10 of Claim 1, the word "liquids" should read --- liquid ---.

In Column 12, Line 33 of Claim 10, the claim reference numerical "10", second occurrence, should read --- 1 ---.

Signed and Sealed this

Sixth Day of November 1979

[SEAL]

Attest:

RUTH C. MASON
Attesting Officer

LUTRELLE F. PARKER
Acting Commissioner of Patents and Trademarks